(12) United States Patent
Herrmann et al.

(10) Patent No.: US 11,305,733 B2
(45) Date of Patent: Apr. 19, 2022

(54) WIPING DEVICE FOR AN OPTICAL DEVICE AND A REAR VIEW DEVICE FOR A MOTOR VEHICLE WITH SAME

(71) Applicant: SMR Patents S.à.r.l., Luxembourg (LU)

(72) Inventors: Andreas Herrmann, Winnenden-Baach (DE); Ilka Rötzer, Denkendorf (DE)

(73) Assignee: SMR Patents S.à.r.l., Luxembourg (LU)

( * ) Notice: Subject to any disclaimer, the term of this patent is extended or adjusted under 35 U.S.C. 154(b) by 45 days.

(21) Appl. No.: 15/881,479

(22) Filed: Jan. 26, 2018

(65) Prior Publication Data

US 2018/0215350 A1 Aug. 2, 2018

(30) Foreign Application Priority Data

Jan. 27, 2017 (DE) .................... 10 2017 101 641.4

(51) Int. Cl.
| | |
|---|---|
| *B60S 1/08* | (2006.01) |
| *B60S 1/56* | (2006.01) |
| *G02B 27/00* | (2006.01) |
| *B60S 1/38* | (2006.01) |
| *B60S 1/52* | (2006.01) |
| *H04N 5/217* | (2011.01) |
| *H04N 5/232* | (2006.01) |

(52) U.S. Cl.
CPC ............... *B60S 1/0848* (2013.01); *B60S 1/38* (2013.01); *B60S 1/524* (2013.01); *B60S 1/56* (2013.01); *G02B 27/0006* (2013.01); *H04N 5/2171* (2013.01); *H04N 5/232* (2013.01); *B60S 2001/3824* (2013.01); *B60S 2001/3836* (2013.01)

(58) Field of Classification Search
CPC .......... B60S 1/0848; B60S 1/38; B60S 1/524; B60S 1/56; B60S 1/48; B60S 1/10; B60S 1/12; B60S 1/46; B60S 1/482; B60S 1/522; B60S 1/528; G02B 27/0006; H04N 5/2171; H04N 5/232
USPC .......... 15/250.04, 250.002; 239/284.1, 284.2
See application file for complete search history.

(56) References Cited

U.S. PATENT DOCUMENTS

| | | | |
|---|---|---|---|
| 9,992,388 B2 * | 6/2018 | Romack | .................. B60R 11/04 |
| 2002/0005440 A1 * | 1/2002 | Holt | ......................... B05B 7/08 |
| | | | 239/284.2 |

(Continued)

FOREIGN PATENT DOCUMENTS

| | | |
|---|---|---|
| DE | 19526249 A1 | 2/1996 |
| DE | 102008042405 A1 | 10/2009 |

(Continued)

OTHER PUBLICATIONS

German Office Action dated Aug. 16, 2017.

*Primary Examiner* — Katina N. Henson
(74) *Attorney, Agent, or Firm* — Jones Day (57) ABSTRACT

A wiping device for an optical device with a lens includes a surface, such as a curved or calotte-shaped surface, where the wiping device has a wiping element for wiping the surface of the lens free from water and dirt particles with at least one passage channel and at least one outlet channel which branches off from the passage channel in order to guide cleaning fluid onto the surface of the lens. In addition, a rear view device for a motor vehicle with an optical device includes such a wiping device.

16 Claims, 6 Drawing Sheets

(56) References Cited

U.S. PATENT DOCUMENTS

| | | |
|---|---|---|
| 2002/0139394 A1 | 10/2002 | Bronson |
| 2007/0124886 A1 | 6/2007 | Tsai |
| 2008/0088702 A1 | 4/2008 | Linsenmaier et al. |
| 2008/0170844 A1 | 7/2008 | Samuel |
| 2011/0047738 A1 | 3/2011 | Gross et al. |
| 2015/0151721 A1* | 6/2015 | Wadzinski ............. B60S 1/546 15/250.04 |
| 2016/0096512 A1* | 4/2016 | Giraud ................. B60S 1/0848 15/250.04 |

FOREIGN PATENT DOCUMENTS

| | | | |
|---|---|---|---|
| DE | 102010054687 A1 | 6/2012 | |
| DE | 102011112266 A1 | 3/2013 | |
| DE | 112014000093 T5 | 9/2015 | |
| EP | 2792555 A1 | 10/2014 | |
| EP | 2792556 A1 | 10/2014 | |
| EP | 2933155 A1 | 10/2015 | |
| FR | 2270124 A1 * | 12/1975 | ................ B60S 1/48 |
| FR | 2471153 A1 * | 6/1981 | ................ A42B 3/26 |
| KR | 20160040094 A * | 4/2016 | ............ B60S 1/0848 |
| WO | WO 2005/039945 A1 | 5/2005 | |
| WO | WO-2015198645 A1 * | 12/2015 | ............. G03B 15/00 |

\* cited by examiner

WIPING DEVICE FOR AN OPTICAL DEVICE AND A REAR VIEW DEVICE FOR A MOTOR VEHICLE WITH SAME

CROSS-REFERENCE TO RELATED APPLICATIONS

This application claims the benefit of foreign priority to German Patent Application No. DE 10 2017 101 641.4, filed Jan. 27, 2017, which is incorporated by reference herein in its entirety for all purposes.

BACKGROUND

1. Field of the Invention

The following description relates to a wiping device for an optical device with a lens. For example, the lens may include a curved or calotte-shaped surface. The following description also relates to a rear view device for a motor vehicle including an optical device and such a wiping device.

2. Related Art

Optical devices with lenses, such as those used in rear view devices for motor vehicles in order to capture camera images of the area behind a motor vehicle, are exposed to environmental influences during operation. In particular, while driving the motor vehicle, such optical devices may become dirty. It is desirable for the lens to be as clean as possible so that the camera images obtained have a sufficiently high quality. A wiping device for cleaning such lens surfaces in rear view devices is described in United States Patent Application Publication No. 2007/0124886 A1. In the field of waterproof cameras, United States Patent Application Publication No. 2008/0170844 A1 describes wiping a protective pane placed in front of the lens using a wiping device. United States Patent Application Publication No. 2002/0139394 A1 also describes the cleaning of a shield for a lens using wiping elements. With the two latter devices, the surface to be wiped is essentially even. European Patent Application No. 2 792 556 A1 describes a wiping device for a surface of an optical element with a shape memory element. For example, this wiping device can be transferred to a different position when subjected to current or heat.

In addition, European Patent Application No. 2 933 155 A1 describes that a cleaning fluid can be included in a wiping element for an optical system. International Patent Application Publication No. WO 2005/039945 A1 describes a wiping element for a windshield which has a passage channel for water and a plurality of exit channels in order to guide the water from the passage channel to the windscreen.

Other wiping devices with fluid lines and fluid outlets are also known with the following additional features:

A wiper strip is described with two contact edges, and a liquid storage slot is formed between the two edges where a number of liquid outlets are formed at the bottom of the liquid storage slot so that the wiper strip can supply lubrication liquid while swinging. This is described in German Patent Application No. DE 11 2014 000 093 T5.

At least two washing nozzles are described which can be alternately coupled with a pump through switchable valves. This is described in German Patent Application No. DE 10 2010 054 687 A1.

A pivotally mounted wiper blade is described, where the position of the wiper blade relative to the glass surface determines the flow of washer fluid. This is described in United States Patent Application Publication No. 2011/0047738 A1.

A spray unit is described which sprays a cleaning medium close to a wiper strip on a vehicle window pane, where the cleaning medium is a liquid, compressed air or a mixture of both and/or the cleaning medium can be heated. This is described in German Patent Application No. DE 10 2008 042 405 A1.

Further, German Patent Application No. DE 10 2011 112 266 A1 describes a method and a control system for controlling a windscreen wiper and/or washing device of a motor vehicle, which has at least one wiper arm movably mounted at a window and at least one nozzle arranged to the wiper arm. The control unit is provided to execute at least two different wash programs for wetting the window with washing liquid in different ways. The control unit can be provided by signals from sensors, detectors, and the on-board electronics of the motor vehicle.

Sensors for detecting water or the like on a window pane of a motor vehicle are described in German Patent Application No. DE 195 26 249 A1. Depending on a rain intensity, the speed of the to and fro movement of a wiping element is increased or reduced. United States Patent Application Publication No. 2008/0088702 A1 describes the detection of dirt on a camera surface through monitoring of an optical test element with the aid of a test beam. According to European Patent Application Publication No. 2 792 555 A1, the movement of a wiper on a surface is monitored with the aid of a sensor.

SUMMARY

In an aspect, at least one object of the following description is to improve a way in which the quality of information is obtained via a lens for optical devices. In particular, an image quality of a camera which includes the lens can be improved. At least one object is to improve the conventional wiping device.

In an aspect, a wiping device for an optical device with a lens having a surface that is curved or calotte-shaped includes a wiping element for wiping the surface of the lens free from water and dirt particles, at least one passage channel, and at least one outlet channel which branches off from the passage channel in order to guide cleaning fluid onto the surface of the lens.

In another aspect, a rear view device for a motor vehicle includes an optical device and a wiping device as described above, where the optical device further includes a camera unit, and the lens is a part of the camera unit.

The wiping device may be provided for wiping the curved or calotte-shaped surface of the lens free from water and dirt particles. The wiping element may have a passage channel through which to transport cleaning fluid, and may further have at least one outlet channel which branches off from the passage channel, in order to guide the cleaning fluid onto the surface of the lens. Due to the supply of cleaning fluid during or before wiping, the wiping element can glide particularly well on the surface of the lens, and can also remove dirt particles particularly well. The invention thus in particular deviates from the idea as it was implemented in prior art, of providing an additional planar surface in front of lenses with curved or calotte-shaped surfaces, and instead, the curved or calotte-shaped surface is directly wiped itself. This enables a better image quality, since there is no covering on the lens.

The wiping element may have an inherent curvature which is adapted to the curved or calotte-shaped surface, and extends along the curvature. Due to the curvature of the wiping element, adapted to the curved or calotte-shaped surface of the lens, namely in particular with the same curvature radius, or merely a slightly larger curvature radius, the lens may be particularly well freed from water and dirt particles.

The wiping device may cooperate with means for supplying cleaning fluid, which includes a device for enabling and/or assisting the flow of cleaning fluid from a container and/or a supply channel, such as a domestic water installation into the passage channel. The device for enabling and/or assisting the flow of cleaning fluid may be, for example, a shut-off device. In particular, it may be a valve or a pump in the form of a dosage pump or it can include both. This device can be controlled or regulated by means of a control or regulation unit. Thus, the cleaning fluid does not have to be applied with each wipe, but can be supplied in a targeted manner, for example at the request of the user by actuating an actuation element. Preferably, a sensor element may be provided for acquiring measured values which allow a statement to be made regarding the degree of contamination and/or the type of contamination of the lens, where the sensor element is interconnected with the control or regulation unit and provides the unit with the measured values. The control or regulation unit may be designed to evaluate the measured values and in a first case to leave the wiping device inactive, and in a second, third, fourth and/or fifth case to set the wiping element in motion.

In the second case, the device for enabling and/or assisting the flow of cleaning fluid from the container may be triggered, or is not triggered, in such a way so that no cleaning fluid gets on the lens through the passage channel and the outlet channels. In a third case, the device is triggered in such a manner that cleaning fluid exclusively gets on the lens through the passage channel and the outlet channels. In a fourth case, the device is triggered in such a manner that water is pumped through the passage channel. In a fifth case, the device is triggered in such a manner that compressed air is pumped through the passage channel.

When using different cleaning fluids, a passage channel may be assigned to each cleaning fluid. In this way, it is not necessary to apply the additional cleaning fluid other than via the passage channel. In another example, the passage channels may meet in at least one outlet channel. In this manner, the fact that outlet channels are already provided which are connected to the first passage channel is exploited.

A plurality of outlet channels may be provided, in order to be able to apply cleaning fluid to the largest area possible on the curved or calotte-shaped surface of the lens.

The units may set the wiping element in an oscillating motion at least at times. In particular, this can be achieved via the device for supplying cleaning fluid, preferably when the wiping element has at least one elastic wiping lip, which in a further preferred manner takes the form of a rubber lip. The setting into an oscillating motion can be achieved through the use of at least one pneumatic cylinder or motor, although preferably the wiping element moves only by itself when the device for supplying cleaning fluid is triggered. This moving by itself can be based on the recoil principle can be used, for example, as is known from sprinkler systems. Springs can ensure a return movement. As an option, a compressed air inlet to the passage channel can be provided.

The wiping element may include a basic body which extends over the diameter of the surface of the lens. Further, the wiping element may include at least one wiping lip which extends from said basic body in the direction of the lens surface, and a foot on the side opposite the wiping lip. Preferably, the foot is mounted movably in a frame. Such a wiping element is on the one hand sufficiently stable to withstand the stresses during wiping and also while a motor vehicle is being driven, but on the one hand sufficiently flexible and mobile.

The wiping element may also include a shape memory element where such an element can preferably be used as a drive for movement from one end position to another end position. See in this regard the embodiments described in European Patent Application No. EP 2 792 556 A1.

In an aspect, the rear view device for a motor vehicle has an optical device and a wiping device, where the lens is part of a camera unit, and a sensor element is provided which is suitable for the lens, typically in the focal plane of the lens or only slightly offset thereto. Here, the camera unit may be protected by a housing which in some areas is confined by the curved or calotte-shaped surface of the lens.

The frame may be attached to a housing of the camera unit and/or a housing of the rear view device. Thus, no separate attachment means for the frame outside of the rear view device must be provided.

The control or regulation unit of the rear view device may preferably be connected to a monitoring unit in the motor vehicle or provided by the unit, in order to trigger the movement of the wiping element and the fluid supply via the device. The latter is preferably performed by means of the recoil principle with springs and/or the use of motors.

BRIEF DESCRIPTION OF THE FIGURES

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

Figure 1:
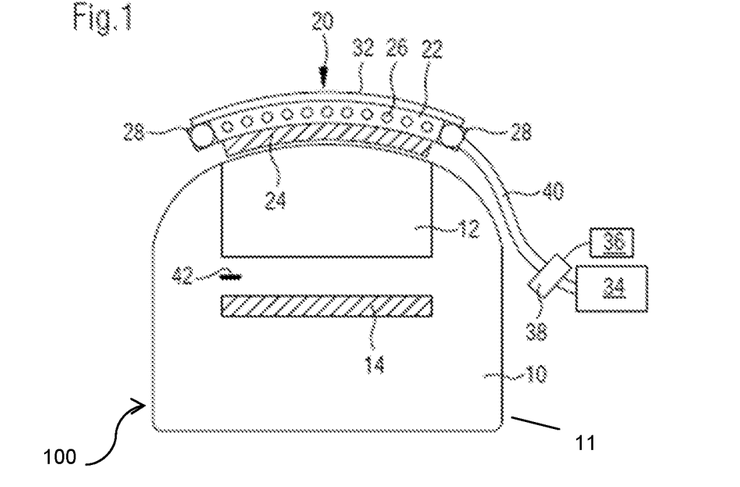
FIG. 1 illustrates a schematic diagram with a top view onto an optical device with a wiping device according to a first embodiment of the invention.
Figure 2:
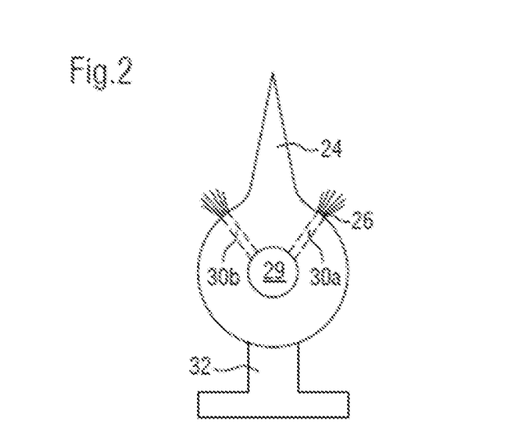
FIG. 2 illustrates a cross section of the wiping element used with the optical device shown in FIG. 1.
Figure 3:
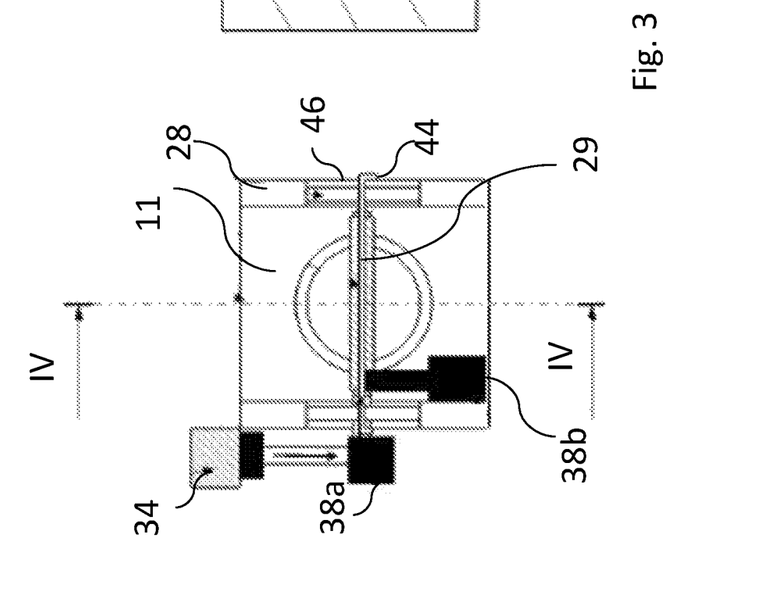
FIG. 3 illustrates a front view of a second embodiment of a wiping device according to the invention on a camera unit.
Figure 4:
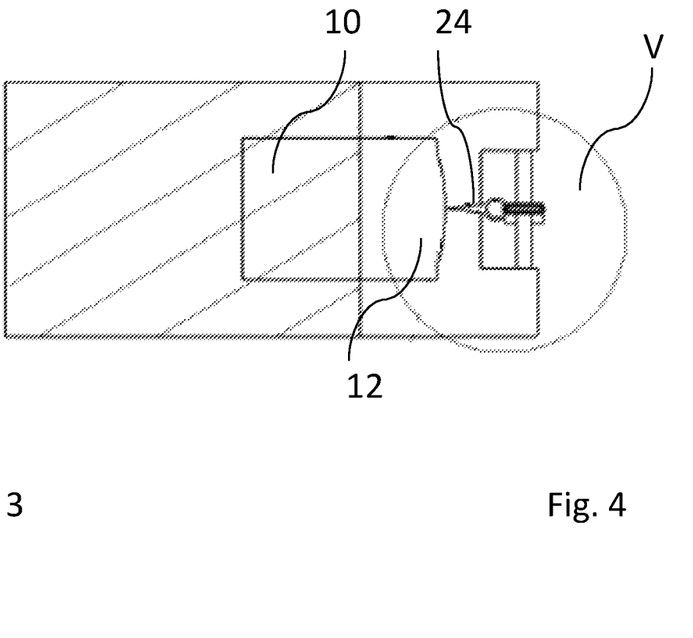
FIG. 4 illustrates cross section IV-IV from FIG. 3.
Figure 5:
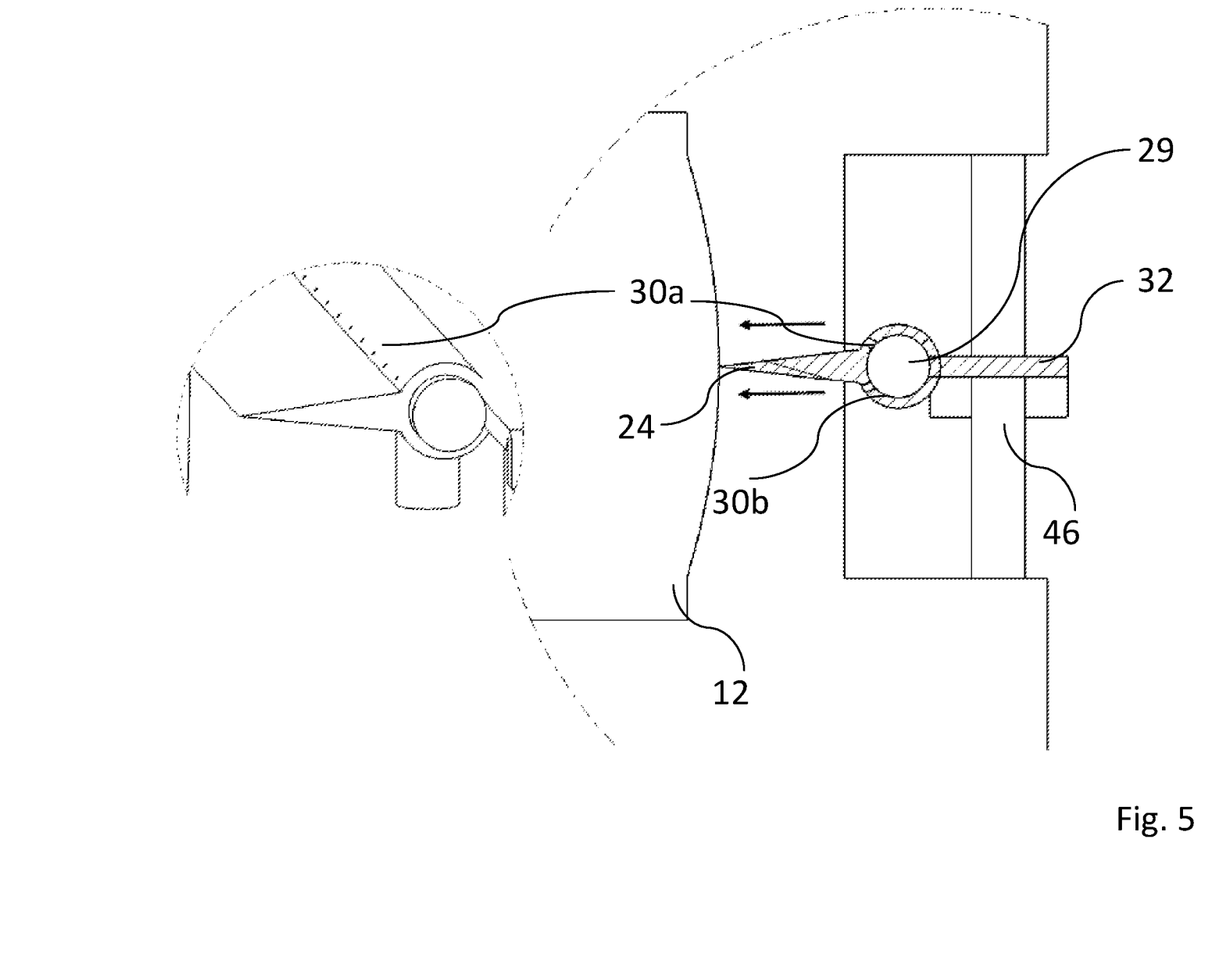
FIG. 5 illustrates section V from FIG. 4 in enlarged form, which illustrates the wiping element.

Referring to FIGS. 1 and 2, the optical device 100 may include in a housing 11 a camera unit 10 with a lens 12, which is produced from special glass for optical lenses, and an image sensor 14 for obtaining images such as a CCD sensor. The lens 12 may have a curved or calotte-shaped surface against which a wiping element 20 of a wiping device is provided. In particular, the wiping element 20 may be a wiper blade which takes the form of a rubber lip 24. In this example, the rubber lip 24 extends away from a basic body 22 of the wiping element 20 which is made of hard rubber or soft rubber. A section view of the wiping element 20 is shown in FIG. 2. It includes exit holes 26 for a cleaning fluid. The wiping element 20 is held on a frame 28 of the wiping device.

The wiping element 20 is shown in FIG. 2 where the basic body 22 can be seen, and the section shown is substantially ring-shaped. In this example, the body 22 includes a central passage channel 29 through which the cleaning fluid can be supplied which is then guided to the exit holes 26 via the outlet channels 30a and 30b which branch off from the passage channel 29. A foot 32 serves to anchor the wiping element 20 in the frame 28.

Figure 6A:
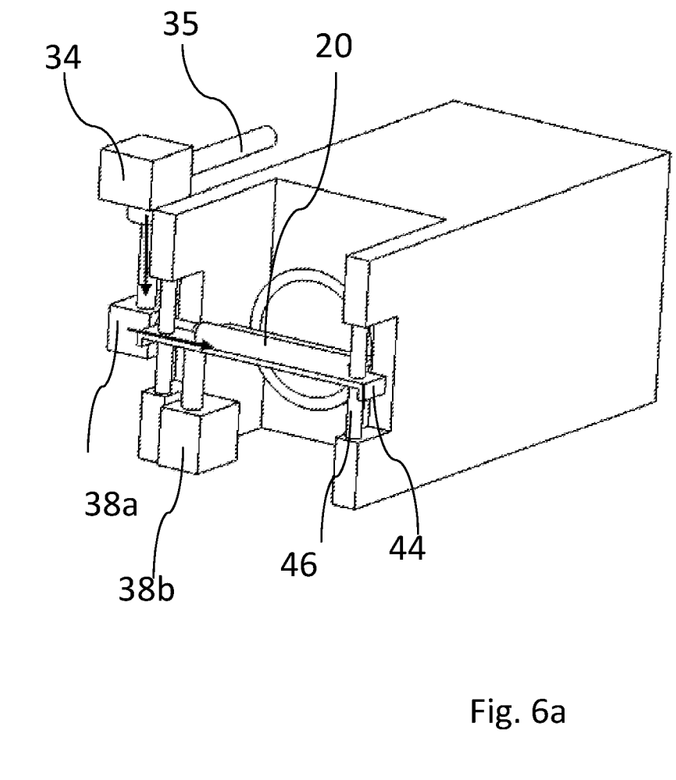
FIGS. 6A and 6B illustrate perspective views of the camera unit with the wiping device from FIGS. 3 to 5.
Figure 6B:
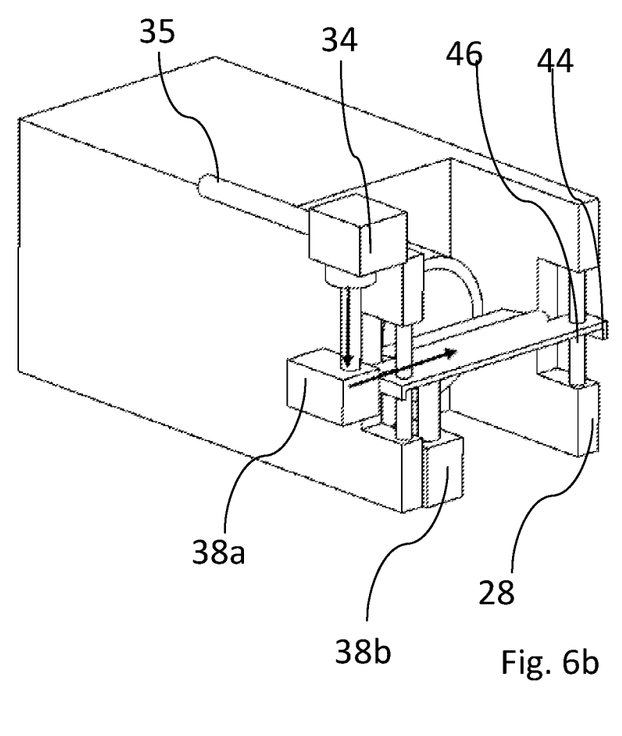

The cleaning fluid is supplied from a reservoir or container 34. The container 34 may be filled with cleaning fluid via a supply line 35, as illustrated in FIGS. 6A and 6B. Instead of a container 34, the supply line 35 may also be provided alone. For example, the supply line 35 may be supplied alone when the cleaning fluid is supplied from a domestic installation line. This is particularly helpful when the wiping device is not provided on a mobile unit such as a motor vehicle but a stationary facility such as with a surveillance camera on a building. The cleaning fluid may be supplied into the passage channel 29 of the wiping element 20 from the container 34, and controlled by a control or regulation unit 36 (e.g., a microprocessor).

Referring to another example illustrated in FIGS. 3 to 6B, the device 38 may be provided by a pump 38a which pumps the fluid out of the container 34, and by a valve 38b which ensures the supply of the cleaning fluid into the passage channel 29. The control or regulation unit 36 controls the device 38 which enables the supply of the cleaning fluid into the passage channel 29 via a supply hose 40.

The opening and closing of the valve 38b or an activation of a corresponding pump 38a is intended to be dependent on the degree of contamination and/or the type of contamination of the curved or calotte-shaped surface of the lens 12. In this example, at least one sensor element 42 may be provided, as illustrated in FIG. 1 between the lens 12 and the image sensor 14. This sensor element 42 may serve to detect contamination, and be interconnected with the control or regulation unit 36.

In situations where dirt is difficult to remove, a cleaning fluid such as a surfactant in can be supplied from the container 34. In cases of only light contamination including when there is high air humidity (fumes), this may not be necessary.

Still referring to FIGS. 3 to 6B, the wiping element 20 may be arranged on a supporting rod 44 which interacts with the guide elements 46 on both sides of the longitudinal extension of the wiping element 20. The guide elements 46 may be designed as compressed air springs. By triggering the pump 38a and the valve 38b, the passage channel 29 gradually fills with cleaning fluid until the cleaning fluid exits from the exit holes 26. In doing so, the wiping element experiences a recoil (as is known from garden sprinkler systems), and moves in a certain direction (for example upwards). The compressed air springs as the guide element 46 counteract this movement and then press the supporting rod back down. In this moment, the supply of cleaning fluid can be suppressed so that the effect of the recoil is not experienced. As soon as the supporting rod 44 has again reached the lower position, cleaning fluid may again be pumped by the pump 38a and let in by the valve 38b. As a result, the recoil may once again take effect and cause the upwards wiping movement. All in all, an oscillating movement of the wiping element 20 may be achieved when the device 38 (including pump 38a and valve 38b) are triggered and suitably clocked.

In another example which is not illustrated in the figure, the valve 38b may allow the supply of cleaning fluid through a first passage channel with exit holes on the upper side, and alternatively through a second passage channel with exit holes on the lower side. Through selective triggering of the respective passage channel, a recoil effect can be provided alternately upwards and downwards, so that in this manner an oscillating movement is made possible as well.

Figure 7:
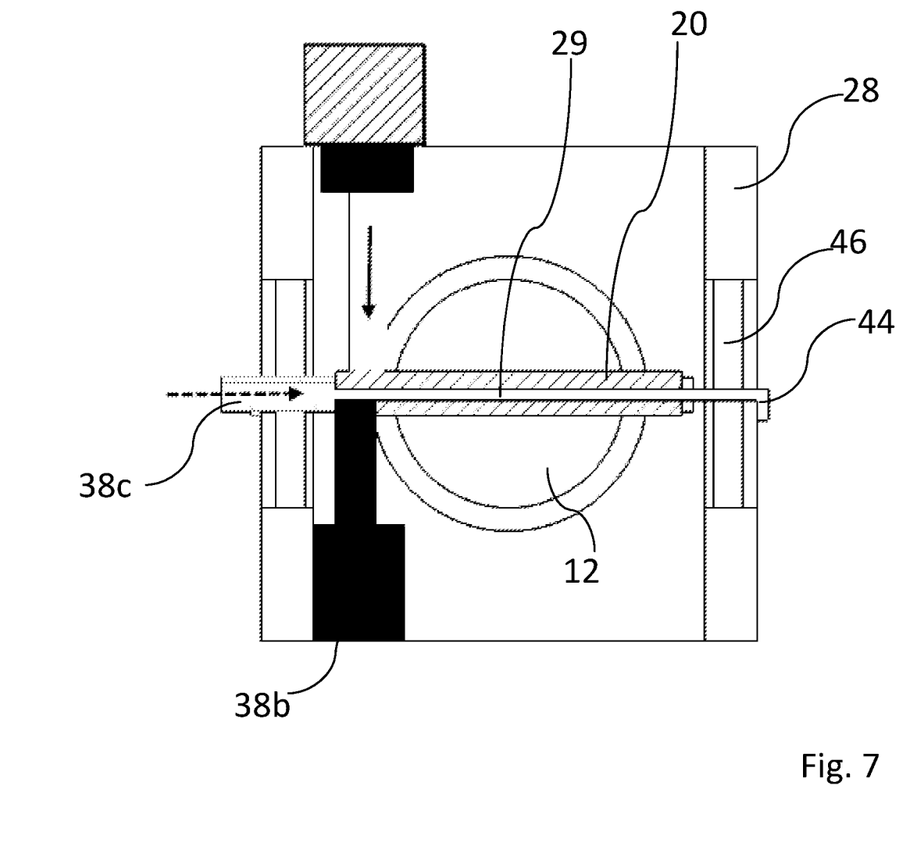
FIG. 7 illustrates a front view of a third embodiment of a wiping device.
Figures 8A, 8B:
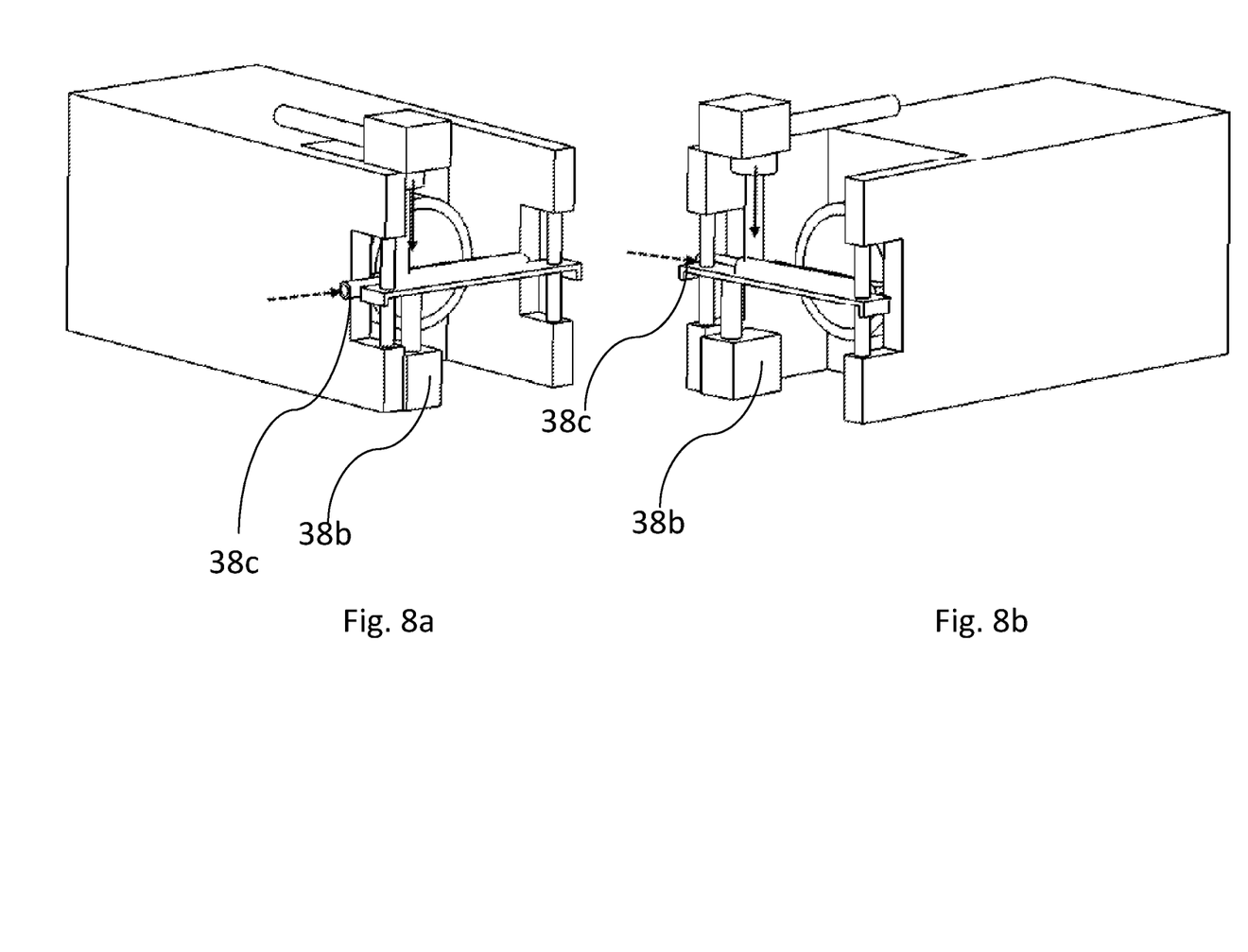
FIGS. 8A and 8B illustrate perspective views of the third embodiment.

Referring to the example illustrated in FIGS. 7 and 8A-8B, the pump 38a of the previous example is not provided. Rather, a connection 38c is provided for supplying compressed air. With the aid of compressed air, the wiping element 20 can be freed from cleaning fluid by simply blowing it out via the exit holes 26. With the aid of compressed air, an oscillating movement of the wiping element 20 can be achieved since a recoil occurs which then drives the supporting rod 44 in a certain direction. The rod may then be forced back by the guide elements 46, in particular by springs.

In another example, it is also possible to clean the surface of the lens 12 with compressed air and water, either alternately or successively. Most preferred is a selective application of compressed air and/or water, namely depending on the degree of contamination.

Instead of the sensor element 42 shown in FIG. 1, a more complex sensor device can be used, e.g., with a device for emitting a test beam such as a laser beam onto a test element or a test section, and with a device for detecting the partial beam reflected or forwarded by the test element or test section. Such an embodiment can be oriented to that described by United States Patent Application Publication No. 2008/0088702 A1.

Instead of a container outside of the wiping element 20, the element may also directly carry a container for the cleaning fluid. For example, this embodiment may be applied in the case of a highly effective cleaning fluid which is only applied in smaller quantities.

The features of the invention disclosed in the above description, in the drawings, and in the claims can be essential both individually and in any combination required for the realization of the invention in its various embodiments.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

LIST OF REFERENCE NUMERALS

10 Camera unit
11 Housing
12 Lens
14 Image sensor
20 Wiping element
22 Basic body (of the wiping element 20)
24 Rubber lip (of the wiping element 20)
26 Exit holes
28 Frame 29 Passage channel
30a Outlet channel
30b Outlet channel
32 Foot (of the wiping element 22)
34 Container
35 Supply line
36 Control or regulation unit
38 Device
38a Pump
38b Valve
38c Connection
40 Supply hose
42 Sensor element
44 Supporting rod
46 Guide elements
100 Optical device

What is claimed is:

1. A wiping device for a camera unit with a housing and a lens which has a surface, the surface being a curved or calotte-shaped surface, the wiping device comprising:
   a wiping element for wiping the surface of the lens of the camera unit free from water and dirt particles, wherein the wiping element comprises a wiper blade and wiping the surface of the lens comprises the wiper blade being in direct physical contact with the surface of the lens;
   at least one passage channel; and
   at least one outlet channel which branches off from the passage channel in order to guide cleaning fluid onto the surface of the lens of the camera un it, the at least one outlet channel being formed in a body of the wiper blade,
   wherein the wiping device cooperates with a device for enabling or assisting the flow of cleaning fluid from at least one of a container and a supply channel into the passage channel, and the device is controlled or regulated by a control or regulation unit,
   wherein the control or regulation unit sets the wiping element and an elastic wiping lip in an oscillating motion only in response to the device for supplying cleaning fluid being triggered,
   wherein the oscillating motion is achieved by a recoil effect in response to the flow of cleaning fluid, and the wiper oscillates and the recoil effect is initiated due to a force of the cleaning fluid being supplied, and
   wherein the camera unit lens is arranged in the camera unit housing.

2. The wiping device of claim 1, wherein the wiping element comprises a curvature which is adapted to the curved or calotte surface of the lens and which extends along the curvature.

3. The wiping device of claim 1, wherein the device comprises at least one pump in form of at least one of a dosing pump, at least one shut-off device, or a valve.

4. The wiping device of claim 1, further comprising at least one sensor element for acquiring measured values related to at least one of a degree of contamination and a type of contamination of the lens, wherein the sensor element is configured to be interconnected with the control or regulation unit for providing the measured values.

5. The wiping device of claim 4, wherein the control or regulation unit is designed to evaluate the measured values and, in response to evaluating the measured values, the control or regulations unit is configured to, at least one of:
   leave the wiping device inactive,
   set the wiping element in motion while no cleaning fluid gets on the lens through the passage channel,
   set the wiping element in motion while the device is triggered so that the cleaning fluid gets on the lens out of the container through the passage channel,
   set the wiping element in motion while the device is triggered so that water is pumped through the passage channel, or
   set the wiping element in motion while the device is triggered so that compressed air is pumped through the passage channel.

6. The wiping device of claim 1, wherein, in response to using different cleaning fluids comprising water and compressed air, a passage channel is assigned to each cleaning fluid, the passage channels configured to meet in at least one outlet channel.

7. The wiping device of claim 1, further comprising a plurality of outlet channels which are configured to be shut off in part via a control or regulation unit.

8. The wiping device according of claim 1, wherein the wiping element comprises at least one elastic wiping lip in form of a rubber lip.

9. The wiping device of claim 8, wherein the wiping element comprises
   an elongated basic body which extends over a diameter of the lens surface;
   the at least one wiping lip which extends from the basic body in a direction of the lens surface; and
   a foot which is mounted movably in a frame on an opposite side of the wiping lip.

10. The wiping device of claim 1, further comprising at least one spring for applying returning forces during the oscillating motion.

11. The wiping device of claim 1, wherein the wiping element is arranged on a supporting rod which interacts with guide elements of the wiping element.

12. The wiping device of claim 11, wherein, at least one of, the guide elements act on both sides of the wiping element, and the guide elements comprise the springs.

13. The wiping device of claim 1, wherein at least one drive of the wiping element comprises a shape memory element.

14. A rear view device, comprising the wiping device of claim 1, wherein a frame is attached to at least one of a housing of the camera unit and a housing of the rear view device.

15. The rear view device of claim 14, wherein a control or regulation unit is connected to a monitoring unit in the motor vehicle or is provided by the monitoring unit, via at least one of springs, pneumatic cylinders, or motors, in order to monitor the movement of the wiping element and the fluid supply via the device.

16. The rear view device of claim 10, wherein the at least one spring counteracts the recoil effect.

* * * * *